United States Patent [19]

Bakal et al.

[11] 4,087,557
[45] May 2, 1978

[54] LONG-LASTING FLAVORED CHEWING GUM INCLUDING SWEETENER DISPERSED IN ESTER GUMS AND METHOD

[75] Inventors: Abraham I. Bakal, Parsippany, N.J.; Frank Witzel, Spring Valley; Donald A. M. Mackay, Pleasantville, both of N.Y.; Daniel Schoenholz, Basking Ridge, N.J.

[73] Assignee: Life Savers, Inc., New York, N.Y.

[21] Appl. No.: 727,837

[22] Filed: Sep. 29, 1976

[51] Int. Cl.² .............................................. A23G 3/30
[52] U.S. Cl. ...................................... 426/3; 426/548; 426/804
[58] Field of Search ........................................ 426/3-6, 426/548

[56] References Cited

U.S. PATENT DOCUMENTS

| 2,286,712 | 6/1942 | Borglin | 426/6 |
| 3,655,866 | 4/1972 | Gilotti | 426/3 |
| 3,826,847 | 7/1974 | Ogawa et al. | 426/3 |

*Primary Examiner*—Jeanette M. Hunter
*Attorney, Agent, or Firm*—Lawrence S. Levinson; Merle J. Smith; Burton Rodney

[57] ABSTRACT

A long-lasting flavored chewing gum is provided which includes gum base containing ester gum and an artificial sweetener, such as the free acid form of saccharin or saccharin salts, the artificial sweetener being dissolved or otherwise entrapped in the ester gum and the ester gum-artificial sweetener being interdispersed in the gum base matrix. A method is also provided for preparing such chewing gum.

19 Claims, No Drawings

LONG-LASTING FLAVORED CHEWING GUM INCLUDING SWEETENER DISPERSED IN ESTER GUMS AND METHOD

FIELD OF THE INVENTION

The present invention relates to a long-lasting flavored chewing gum which contains gum base, ester gum dispersed throughout the gum base, and an artificial sweetener such as free saccharin acid or soluble saccharin salts dissolved or otherwise dispersed in the ester gum portion of the gum base, and to a method for preparing such gum.

BACKGROUND OF THE INVENTION

Conventional chewing gum generally includes gum base composed of ester gum, polyvinyl acetate, latex acids, natural and/or synthetic rubbers, waxes, texturizers and bulking agents; water-soluble flavoring and water-soluble sweeteners, for example, various sugars such as sucrose and dextrose, and/or artificial sweeteners such as sodium or calcium saccharin, cyclamates, dihydrochalcones, glycyrrhizin, glycyrrhizinates; emulsifiers such as lecithin, mono- and diglycerides, and flavors. Such gum initially provides a desirable strong sweet taste which declines rapidly during the first three to five minutes of chewing to a very slight perceptible level of sweetness and flavor. The result is that after about five minutes of chewing all that remains in the mouth is an essentially tasteless wad which provides little in the way of flavor, aroma or sweetness. Accordingly, there clearly is a need and long-felt want for a chewing gum which possesses long-lasting flavor and sweetness.

It has been found that the sweetness and flavor of chewing gums such as non-sour flavored (mint), fruit flavored and sour chewing gums can be prolonged by incorporating or entrapping an artificial sweetener and/or flavor in the ester gum component of the gum base portion of the chewing gum. The artificial sweetener and/or flavor are thereby substantially retained in the gum base and during chewing undergo slow and controlled release into the saliva.

It is important in the above chewing gum that artificial sweeteners and/or food acids which are relatively insoluble, such as free saccharin acid, fumaric acid, adipic acid and succinic acid remain in the gum base for as long as possible without being solubilized therefrom. However, it has been found that where conventional gum base compositions, that is, those gum bases containing calcium carbonate (chalk) as a filler and/or texturizing agent are employed in forming the chewing gum, the chewing gum tends to lose its sweetness retention properties after a few weeks of shelf storage at room temperature. Apparently, during storage, the free acid form of saccharin and the above-mentioned food acids react with the chalk in the gum base to form the calcium saccharin salt and corresponding calcium salts of the food acids which are solubilized from the chewing gum substantially faster than the free acids themselves. Thus, it is preferred that conversion of the free saccharin acid and food acids to a soluble salt should be avoided where possible.

DETAILED DESCRIPTION OF THE INVENTION

The terms "coat," "coated," "coating," "entrapping," "solubilizing," "dissolving," and these terms having other suffixes as employed herein are intended to refer to the incorporation in or application of the ester gum material to the artificial sweeteners or food acids or other flavors by dissolution, dispersion, integration, encapsulation or any other conventional technique of physically combining the ester gum with the artificial sweetener and/or food acid, and/or other flavoring.

Conventional chewing gum provides initially a very strong sweet taste which declines very rapidly in the first 3 or 4 minutes of chewing to only a slight level of sweetness and then declines steadily until stabilizing at a very low sweetness level at about 10 to about 12 minutes of chewing. The chewing gum of the present invention, on the other hand, which contains the sweetener incorporated with the ester gum component of the gum base, provides a chewing gum whose sweetness corresponds to that of conventional gum for the first 3 minutes but, thereafter, begins to drop more slowly and stabilizes after about 5 minutes of chewing at a desirable sweetness level. This sweetness level remains essentially stable for 30 minutes or more of chewing. In the chewing gum of the invention, during the first few minutes of chewing, the perceived sweetness is due only to sugars or sugar alcohols, or soluble artificial sweeteners (not combined with the ester gum) present in the chewing gum. Thereafter, the artificial sweetener combined with the ester gum is released, flavor is stabilized and the sweet taste persists for extended periods of chewing of up to 30 minutes or more.

In view of the above, it will be appreciated that by incorporating the artificial sweetener in the ester gum compound, in accordance with the invention, the initial sweetness impact of the sweetener is reduced or delayed. Thus, the artificial sweetener incorporated in the ester gum may be used in sugar or sugar alcohol or artificial soluble sweetener-containing chewing gums where a second burst of sweetness from the ester gum combination is desired to produce a long-lasting flavored gum which will not have the overpowering sweetness which would normally result where uncoated sweeteners and sugar are employed together.

In forming the ester gum combination with sweetener, food acid or flavor, the ester gum material will be employed in a weight ratio to the sweetener, food acid or other flavor of within the range of from about 200:1 to about 0.5:1, and preferably from about 50:1 to about 4:1, so as to provide a concentration of artificial sweetener or food acid in the ester gum preferably within the range of from about 0.5 to about 50% by weight of the ester gum.

The artificial sweetener and/or food acids as discussed below will be present in the gum base in an amount within the range of from about 0.02 to about 15% and preferably from about 0.25 to about 4% by weight of the gum base, and will be present in the finished chewing gum in amounts ranging from about 0.002 to about 4.5% and preferably from about 0.05 to about 1%.

The ester gum component will comprise methyl, glycerol or pentaerythritol esters of rosins or modified rosins, such as hydrogenated, dimerized or polymerized rosins or mixtures thereof. Examples of ester gums suitable for use herein include pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated methyl ester of rosin, or mixtures of any two or more of the above.

In preferred embodiments, the water-soluble artificial sweeteners, such as the soluble saccharin salts, cyclamate salts, glycyrrhizins, dihydrochalcones, aspartame (1-aspartyl-1-phenylalanine methyl ester), will be employed in conjunction with ester gums of relatively low viscosities, for example, ranging from liquids of viscosity of 23 poises to materials of softening points of 80° C, while the poorly water-soluble artificial sweeteners, such as free saccharin acid or free cyclamic acid will be employed in conjunction with ester gums of relatively high viscosities, for example, ranging from softening points of 80° C to 126° C. In fact, the free saccharin acid will be substantially solubilized in the ester gum to form a solution.

All of the above compounds are known to be insoluble in water and are used in gum base compositions and known in the art as ester gums. The range of these compounds present in the gum base may be from about 5% to about 50% of the gum base. The preferred range is from about 15 to about 40%.

It has been found that free saccharin acid is soluble or partially soluble in ester gums. In addition, flavor or food acids such as citric, fumaric, malic, ascorbic, tartaric, adipic, succinic, etc., are also soluble or partially soluble in ester gums. In contrast, the water soluble salts of these acids are less soluble. The sodium and calcium salts of saccharin have been found to be much less soluble than the free saccharin acid. However, they are readily dispersible in the melted ester gums.

the artificial sweetener or food acid or other flavor may be coated, incorporated, entrapped, dissolved, dispersed, or otherwise combined with the ester gum employing conventional coating, dissolution or encapsulation technology. For example, where free saccharin acid is employed, the ester gum is melted in a steam kettle equipped with a mixer and the free saccharin acid is added and thoroughly mixed with the ester gum to form a solution containing 0.5 to 50% free saccharin acid. The mix is removed from the kettle and cooled and incorporated in other gum base components to form a gum base.

Where the artificial sweetener and/or food acid or other flavor is only partially soluble or even poorly soluble in the ester gum, a dispersion of such materials in the ester gum is formed whereby the material is entrapped in the ester gum and the combination interdispersed in the gum base matrix.

It will also be appreciated that the ester gum-sweetener or food acid or other flavor combination of the invention may be employed in chewing gum which includes sugar and/or other uncoated artificial water-soluble or poorly water-soluble sweeteners such as free saccharin, saccharin salts, cyclamates, glycyrrhizin, dihydrochalcones and the like.

The gum base will be present in an amount ranging from about 10 to about 50%, and preferably from about 15 to 30% by weight of the chewing gum composition.

In general, the gum base is prepared by heating and blending various ingredients, such as natural gums, synthetic resins, waxes, plasticizers, etc., in a manner well known in the art. Typical examples of the ingredients found in a chewing gum base are masticatory substances of synthetic origin such as styrene-butadiene copolymer, isobutyleneisoprene copolymer, polyisobutylene, polyethylene, petroleum wax, polyvinyl acetate, as well as masticatory substances of natural origin such as rubber latex solids, chicle, crown gum, nispero, rosidinha, jelutong, pendare, perillo, niger gutta, tunu, etc. The elastomer of masticatory substance will be employed in an amount within the range of about 5 to about 15%, preferably from about 8 to about 12%, and optimally from about 9 to about 11% by weight of the gum base composition.

In addition, the gum base will preferably contain a solvent for the elastomer which should have minimal tackifying properties and will preferably comprise hydrogenated ester gum, that is, glycerol ester of hydrogenated rosin and/or dimerized ester gum. However, other solvents may be employed such as pentaerythritol ester gum, polymerized ester gum, and ester gum. The solvent will be employed in an amount ranging from about 10 to about 40%, preferably from about 18 to about 30%, and optimally from about 20 to about 25% by weight of the gum base.

The gum base may also include a hydrophilic-type detackifier which will sorb saliva and become slippery and is incompatible with the elastomer and solvent for the elastomer. Examples of such materials suitable for use herein will include vinyl polymers having a molecular weight within the range of from about 2000 to about 10,000 or more, such as polyvinyl acetate, polyvinyl butyl ether, copolymers of vinyl esters and vinyl ethers. It will be appreciated that the polyvinyl acetate or any other material which may be present in the gum base will not serve the function of the coating agent for the chalk or the sweetener and that such coating agent must be separately applied to the chalk or sweetener.

The gum base may also include hard waxes which serve as lubricants and should have a melting point of above about 65° C and preferably above about 75° C. Examples of such hard waxes include candelilla wax, paraffin wax, carnauba wax, ozokerite, oricury, microcrystalline wax, and the like. The hard waxes will be employed in an amount within the range of from about 0 to about 50% by weight of the gum base, preferably from about 17 to about 40%, and optimally from about 20 to 30% by weight. The preferred hard waxes are candelilla wax and paraffin wax employed in combination so that from 2 to about 8% (based on the weight of the gum base) of the candelilla is employed with from about 15 to about 30% (based on the weight of the gum base) of the paraffin wax. The waxes are found to reduce the tackiness of the final gum composition without significantly reducing cohesivity thereof.

The hydrophilic-type detackifier will be employed in an amount within the range of from about 20 to about 40% by weight of the gum base, preferably from about 25 to about 35%, and optimally from about 28 to about 32% by weight of the gum base.

The gum base may also include a softening agent and lubricant combination which may comprise one or more hydrogenated vegetable or animal fats having a high melting point, that is above about 22° C, and preferably above about 50° C; such softening agent and/or lubricant may be employed in amounts ranging from about 0 to about 15% by weight of the gum base, preferably from about 4 to about 12%, and optimally from about 5 to about 10%.

The gum base will also include an emulsifier to impart hydrophilic properties to the gum base so that saliva will be absorbed thereby making the gum base slippery; the emulsifier will be employed in amounts ranging from about 2 to about 12% by weight of the gum base, preferably from about 3 to about 8%, and optimally from about 5 to about 7%. Examples of such emulsifiers include glyceryl monostearate, phosphatides, such as lecithin and cephalin, Tweens, Spans and mixtures thereof.

In addition, the gum base may include colorants such as titanium dioxide, plasticizers, such as lanolin, stearic acid, sodium stearate, potassium stearate and the like, antioxidants, in an amount up to about 1000 ppm of the gum base, such as butylated hydroxyanisole, butylated hydroxytoluene, and propyl gallate.

The gum base may also contain particles of chalk (CaCO$_3$) as a bulking agent and texturizer in amounts ranging from about 0 to about 50%, and preferably less than about 1 to about 25% by weight of the gum base.

The water-insoluble gum base may consist of any of the various bases disclosed for example in U.S. Pat. Nos. 3,052,552 and 2,197,719. Typical ingredients included in gum base compositions are the following:

| | Parts by Weight |
|---|---|
| Base I | |
| Ester gum | 88 |
| Rubber latex solids | 10 |
| Lecithin | 2 |
| Base II | |
| Chicle | 30 |
| Jelutong | 60 |
| Gutta soh | 8.5 |
| Lecithin | 2 |
| Base III | |
| Partially oxidized chicle | 98 |
| Lecithin | 2 |
| Base IV | |
| Jelutong (dry) | 80 |
| Gutta siak | 18 |
| Lecithin | 2 |

The chewing gum of the invention may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise oils derived from plants, leaves, flowers, fruit, etc. Representative flavor oils of this type include citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum of the invention with or without conventional preservatives.

The chewing gum of the invention will optionally, and preferably, include an easily extractable or water-soluble sweetener, the easily extractable sweetener being present in an amount ranging from about 90 to about 0.05%, preferably from about 85 to about 70% by weight of the final product to provide an initial burst of sweetness. Such water-soluble sweeteners may include one or more sugars, sugar alcohols, or sugar containing material, for example, monosaccharides disaccharides and polysaccharides, some examples of which follow:

A. Monosaccharides of 5 or 6 carbon atoms — arabinose, xylose, ribose, glucose, mannose, galactose, fructose, dextrose, or sorbose or mixtures of two or more of the foregoing monosaccharides.

B. Disaccharides — sucrose such as cane or beet sugar, lactose, maltose or cellobiose; and C. Polysaccharides — partially hydrolyzed starch, dextrin or corn syrup solids.

The sugar alcohols include sorbitol, xylitol, maltitol or mannitol.

In a preferred embodiment, sorbitol will be included in combination with sugar as the water-soluble sweetener. In such case, the sorbitol will be present in an amount within the range of from about 2 to about 20% by weight of the chewing gum composition, preferably from about 5 to about 15%, and optimally from about 8 to about 12%.

Furthermore, any of the water-soluble artificial or natural sweeteners set out hereinbefore may be present together with the artificial sweetener combined with the ester gum. In each of the preferred embodiments of the chewing gum and method of the invention, corn syrup will be employed as the plasticizer. However, satisfactory results may be obtained, for example, by employing sorbitol syrups, modified starches and the like, without the use of and presence of corn syrup in the chewing gum.

The method for forming a long-lasting flavored gum includes the steps of admixing melted gum base containing the ester gum-artificial sweetener and/or food acid combination dispersed therein with a plasticizer such as syrupy substance such as corn syrup or a modified starch syrup or sorbitol syrups and emulsifier such as lecithin, at a temperature ranging from about 180° to about 210° F, to form a base-syrup mix, and (where desired) adding flavor oil, sugar, sorbitol, and other flavor to the mix with stirring. The resulting mix is then formed into sticks or tablets of chewing gum employing conventional techniques.

The following Examples represent preferred embodiments of the present invention.

EXAMPLE 1

Two thousand grams of glycerol ester of partially hydrogenated wood rosin (Staybellite #5 Hercules) is melted in a steam jacketed kettle equipped with sigma blades mixer. The temperature of the kettle is maintained between 180° F to 240° F. Eighty-seven grams of powdered particulate sodium saccharin is added and mixed thoroughly to produce a fine dispersion of the particles in the melted rosin. The sodium saccharin rosin mixture (4.35% sodium saccharin in rosin) is removed from the kettle and cooled into a slab.

A sample of this material is ground with a laboratory grinder. A 5 grams aliquot having a particle size ranging between 50 and 100 mesh is stirred, under standard stirring conditions, with 30 ml of distilled water. After 5 minutes, the liquid is filtered and analyzed for saccharin content using a standard UV technique. The solids are extracted with another 30 ml of distilled water for another 5 minutes and filtered and the filtrate analyzed. This procedure is repeated until four extractions are made. The extraction data are summarized below:

| Extract | Cumulative Extraction Time (min.) | Cumulative Percent of Original Saccharin Extracted |
|---|---|---|
| 1st | 5 | 34.5 |

-continued

| Extract | Cumulative Extraction Time (min.) | Cumulative Percent of Original Saccharin Extracted |
|---|---|---|
| 2nd | 10 | 44.5 |
| 3rd | 15 | 49.7 |
| 4th | 20 | 56.5 |

These data clearly demonstrate that the glycerol ester of partially hydrogenated wood rosin provides protection to the water soluble sodium saccharin and after 20 minutes of stirring about 46% of the saccharin remains in the ester gum.

EXAMPLE 2

A mixture of sodium saccharin and an ester gum is prepared in a manner similar to that described in Example 1 except that glycerol ester of partially dimerized wood rosin (Arochem 345 — Archer Daniels Midland) is used instead of the glycerol ester of partially hydrogenated wood rosin.

A sample of 5 grams of the sodium saccharin-ester gum mixture is subjected to the extraction technique in the manner described in Example 1. The extraction data obtained are as follows:

| Extract | Cumulative Extraction Time (min) | Cumulative Percent of Original Saccharin Extracted |
|---|---|---|
| 1st | 5 | 67.3 |
| 2nd | 10 | 86.8 |
| 3rd | 15 | 98.8 |
| 4th | 20 | 100.0 |

These data clearly indicate that the glycerol ester of partially dimerized wood rosin provides protection to the water soluble sodium saccharin.

EXAMPLE 3

A mixture of free saccharin acid and glycerol ester of partially hydrogenated wood rosin is prepared employing the technique described in Example 1.

A sample of the glycerol ester of partially hydrogenated wood rosin containing 4.35% free saccharin acid is extracted with water employing the procedure described in Example 1. The extraction data obtained are as follows:

| Extract | Cumulative Extraction Time (min.) | Concentration of Free Saccharin in Each Extract (%) | Cumulative Percent of Original Saccharin Extracted |
|---|---|---|---|
| 1st | 5 | 0.193 | 12.9 |
| 2nd | 10 | 0.122 | 21.0 |
| 3rd | 15 | 0.072 | 25.8 |
| 4th | 20 | 0.060 | 29.0 |

According to Lange's *Handbook of Chemistry*, 71st edition, the solubility of free saccharin in water at 25° C is 0.4%. Thus, it is clear that the glycerol ester of partially hydrogenated wood rosin affords a protective coating to the free saccharin, and controls its release.

EXAMPLE 4

A free saccharin acid-ester gum mixture is prepared employing the procedure described in Examples 1 and 3 except that the glycerol ester of partially hydrogenated wood rosin is replaced by the glycerol ester of partially dimerized wood rosin.

The extraction data obtained employing the technique described in Example 1 are as follows:

| Extract | Cumulative Extraction Time (min.) | Concentration of Free Saccharin in Each Extract (%) | Cumulative Percent of Original Saccharin Extracted |
|---|---|---|---|
| 1st | 5 | 0.0026 | 1.7 |
| 2nd | 10 | 0.1170 | 9.5 |
| 3rd | 15 | 0.0900 | 15.5 |
| 4th | 20 | 0.0585 | 19.4 |

These data demonstrate the capability of glycerol ester of partially dimerized wood rosin to control the extraction of the free saccharin acid.

EXAMPLE 5

To a steam jacketed kettle equipped with a sigma blades mixer are added 30 parts polyvinyl acetate, 10 parts of ester gums, 10 parts latex solids, 30 parts waxes, 9 parts of titanium dioxide, mono and diglycerides and antioxidant. 11 Parts of glycerol ester of partially hydrogenated wood rosin containing 9% sodium saccharin and prepared as described in Example 1 are added to the steam jacketed kettle. The dough is mixed for approximately 20 minutes while maintaining the temperature between 170° F. The gum base is then removed from the kettle and cooled.

The resulting gum base has now sodium saccharin, entrapped in the glycerol ester of partially hydrogenated wood rosin, interdispersed in the gum base matrix.

EXAMPLE 6

Spearmint flavored chewing gum is prepared using the gum base prepared as described in Example 5. The composition is as follows:

|  | Parts by Weight |
|---|---|
| Gum Base (containing Na saccharin pre-suspended in ester gum) | 21 |
| Corn syrup | 17 |
| Sugar | 49.8 |
| Sorbitol | 10 |
| Flavor | 1 |
| Gum Arabic Coated Flavor | 1 |
| Lecithin | 0.2 |

In preparing the above composition, the gum base is melted and the corn syrup and lecithin are added and mixed. The artificial flavor is added and mixed for 3 minutes followed by sugar addition and mixing for 3 minutes. The sorbitol is then added, mixed for 2 minutes and the gum arabic coated flavor added and mixed for 2 minutes. The mass is removed from the kettle, rolled, scored and cut into chewing gum sticks.

This chewing gum was presented to an expert chewing gum taste panel and the panelists were asked to compare this gum for sweetness and flavor duration with a commercial gum (Life Savers Spearmint gum — Control I) and with a chewing gum (Control II) containing all of the above ingredients except that the sodium saccharin is added to the melted gum base and thoroughly mixed therein and is not dispersed in an ester gum.

The panel was presented with coded samples of commercial and experimental gums. The testing procedure was as follows:

Panelists chewed one of the gums for 5 minutes, at which time the bolus was removed and put aside in a paper cup. Panelits then chewed the other gums for the same length of time and put the bolus in other cups.

Panelists then rinsed their mouths with water and consumed crackers to remove residual flavor in the oral cavity. This rinsing and rest period lasted one minute. Then panelists tasted each of the boluses and rated the level of sweetness and flavor on a 0–8 hedonic scale.

This same procedure was repeated after 10, 15 and 20 minutes of chewing.

For purposes of this test, the quality attributes were defined as follows:

Sweetness: — The sweet sensation perceived in the oral cavity by the taste buds.

Overall Flavor: — The overall flavor sensation perceived in the oral cavity. The scale used was described as follows:

0 — none
2 — perceptible
4 — definite
6 — strong
8 — very strong

Average scores of experimental and commercial gums are summarized below:

| | | \multicolumn{4}{c}{Time (min.)} | | | |
|---|---|---|---|---|---|
| | | 5 | 10 | 15 | 20 |
| Example 6 | Sweetness | 4.3 | 3.3 | 2.0 | 1.3 |
| | Overall Flavor | 4.8 | 3.8 | 2.3 | 1.8 |
| Control I Commercial Gum (Life Savers) | Sweetness | 2.0 | 0.8 | 0.3 | 0.0 |
| | Overall Flavor | 2.5 | 1.5 | 0.5 | 0.3 |
| Control II | Sweetness | 3.6 | 2.4 | 1.2 | 0.6 |
| | Overall Flavor | 3.4 | 2.2 | 1.2 | 0.7 |

Data were subjected to statistical analysis and indicate that the Example 6 gum of the invention is significantly sweeter and more flavorful than the Control I and II gums even after 15 minutes of chewing.

EXAMPLE 7

Four thousand grams of a 1:1 mixture of glycerol ester of partially hydrogenated wood rosin and glycerol ester of partially dimerized rosin are introduced into a steam jacketed kettle equipped with sigma blades mixer. The ester gums are melted while mixing and the temperature is maintained between 170° F and 240° F. To the melted rosins 812 grams of free saccharin acid are added and thoroughly mixed. After 20 minutes of mixing, the mass is removed from the kettle and cooled. The saccharin acid is solubilized in the ester gums as evidenced by the absence of visible particles entrapped in the solid.

The concentration of saccharin in the ester gum is 4.35 percent.

A gum base comprised of 30 parts polyvinyl acetate, 10 parts latex solids, 28 parts waxes and 9 parts of titanium oxide, mono and diglycerides and antioxidant is prepared. After washing and drying, 22 parts of ester gums containing the free saccharin acid prepared as described above are added to the mix. The mixing is continued for about 20 minutes, while the temperature is maintained between 180° F and 240° F.

This gum base contains 1.0% of free saccharin acid.

EXAMPLE 8

Spearmint flavored chewing gum is prepared using the gum base described in Example 7. The composition of the gum and the method of preparation are as described in Example 6.

This chewing gum is presented to a trained taste panel and evaluated against a commercial chewing gum (Control III — Life Savers Spearmint sugar-containing gum) and against a chewing gum (Control IV) containing all of the ingredients of the Example 8 gum except that the free saccharin acid is not dispersed in the ester gum but is added with the corn syrup.

Average scores of the Example 8 and control gums are summarized below:

| | | Time (min.) | | | |
|---|---|---|---|---|---|
| | | 5 | 10 | 15 | 20 |
| Example 8 | Sweetness | 5.0 | 3.6 | 2.6 | 1.7 |
| | Overall Flavor | 5.0 | 4.2 | 3.2 | 2.8 |
| Control III Gum | Sweetness | 2.2 | 0.4 | 0.0 | 0.0 |
| | Overall Flavor | 2.8 | 1.2 | 0.8 | 0.2 |
| Control IV Gum | Sweetness | 3.8 | 2.4 | 1.8 | 1.6 |
| | Overall Flavor | 3.4 | 2.8 | 2.0 | 1.4 |

These data clearly indicate that the Example 8 gum of the invention is superior to the commercial gum (Control III) and the Control IV gum and has a long-lasting flavor and sweetness of 20 minutes or more.

EXAMPLE 9

Two thousand grams of glycerol ester of partially hydrogenated wood rosin is melted in a steam jacketed kettle equipped with sigma blades mixer. The temperature of the kettle is maintained between 180° F to 240° F. 364 grams of powdered fumaric acid are added and mixed thoroughly to produce a fine dispersion of the particles in the melted rosin. The fumaric acid-rosin mixture (15.4 percent fumaric acid in rosin) is removed from the kettle and cooled into a slab and ground with a laboratory grinder.

To a steam jacketed kettle equipped with a sigma blades mixer are added 30 parts polyvinyl acetate, 10 parts of ester gums, 10 parts latex solids, 36 parts waxes, 9 parts of titanium dioxide, mono and diglycerides and antioxidant. 11 Parts of glycerol ester of partially hydrogenated wood rosin containing fumaric acid and prepared as described above are added to the steam jacketed kettle. The dough is mixed for approximately 20 minutes while maintaining the temperature between 170° F and 240° F. The gum base is then removed from the kettle and cooled.

The resulting gum base has now fumaric acid entrapped in the glycerol ester of partially hydrogenated wood rosin, interdispersed in the gum base matrix.

EXAMPLE 10

Cherry flavored chewing gum is prepared using the gum base prepared as described in Example 9. The composition is as follows:

| | Parts by Weight |
|---|---|
| Gum base (containing fumaric acid pre-suspended in ester gum and prepared as described in Example 9) | 25 |
| Corn syrup, 44° Be' | 15 |
| Citric acid | 0.7 |
| Sugar | 46 |

|  | Parts by Weight |
| --- | --- |
| Sodium saccharin | 0.2 |
| Sorbitol | 10 |
| Cherry Oil | 0.8 |
| Cherry (spray-dried) | 2 |
| Lecithin | 0.2 |

In preparing the above composition, the gum base is melted and the corn syrup, sodium saccharin and lecithin are added and mixed. The cherry oil is added and mixed for 3 minutes followed by sugar addition and mixing for 3 minutes. The sorbitol is then added, mixed for 2 minutes and the gum cherry flavor (spray dried) added and mixed for two minutes. The mass is removed from the kettle, rolled, scored and cut into chewing gum sticks.

EXAMPLE 11

Two thousand grams of glycerol ester of partially hydrogenated wood rosin is melted in a steam jacketed kettle equipped with sigma blades mixer. The temperature of the kettle is maintained between 180° to 240° F. One hundred-eighty grams of powdered particulate calcium saccharin and 364 grams tartaric acid are added and mixed thoroughly to produce a fine dispersion of the particles of calcium saccharin and tartaric acid in the melted rosin. The calcium saccharin-tartaric acid-rosin mixture (7% calcium saccharin and 14.3% tartaric acid in rosin) is removed from the kettle and cooled into a slab and ground with a laboratory grinder to a particle size ranging between 50 and 100 mesh.

To a steam jacketed kettle equipped with a sigma blades mixer are added 30 parts polyvinyl acetate, 10 parts of ester gums, 10 parts latex solids, 30 parts waxes, 9 parts of titanium dioxide, mono and diglycerides and antioxidant. 11 Parts of glycerol ester of partially hydrogenated wood rosin containing calcium saccharin and tartaric acid and prepared as described above are added to the steam jacketed kettle. The dough is mixed for approximately 20 minutes while maintaining the temperature between 170° and 240° F. The gum base is then removed from the kettle and cooled.

The resulting gum base has now calcium saccharin and tartaric acid entrapped in the glycerol ester of partially hydrogenated wood rosin, interdispersed in the gum base matrix.

EXAMPLE 12

Cherry flavored chewing gum is prepared using the gum base prepared as described in Example 11. The composition is as follows:

|  | Parts by Weight |
| --- | --- |
| Gum base (containing Ca saccharin and tartaric acid pre-suspended in ester gum and prepared as described in Example 9) | 23 |
| Corn syrup, 44° Be' | 17 |
| Citric acid | 0.7 |
| Sugar | 46.1 |
| Sorbitol | 10 |
| Cherry oil | 1 |
| Cherry (spray dried) | 2 |
| Lecithin | 0.2 |

In preparing the above composition, the gum base is melted and the corn syrup and lecithin are added and mixed. The cherry oil is added and mixed for 3 minutes followed by sugar addition and mixing for 3 minutes. The sorbitol is then added, mixed for 2 minutes and the gum cherry flavor (spray dried) added and mixed for two minutes. The mass is removed from the kettle, rolled, scored and cut into chewing gum sticks.

What is claimed is:

1. A flavored chewing gum having a prolonged sweet taste comprising gum base, and an ester gum, and from about 0.02 to about 15% by weight of artificial sweetener, based on the weight of the gum base component, interdispersed in the gum base, said chewing gum being prepared by the process which comprises the steps of incorporating the artificial sweetener in the ester gum prior to incorporating the ester gum in the gum base, combining the resulting combination with gum base ingredients to form a gum base, and mixing the gum base with one or more flavors and sweeteners to form a chewing gum, said ester gum providing a protective shield for the artificial sweetener to control release of said artificial sweetener from the gum base.

2. The flavored chewing gum according to claim 1 wherein said ester gum is present in a weight ratio to said artificial sweetener of within the range of from about 200:1 to about 0.5:1.

3. The flavored chewing gum according to claim 1 wherein said ester gum comprises one or more methyl, glycerol or pentaerythritol esters of rosins or modified rosins.

4. The flavored chewing gum according to claim 3 wherein the ester gum is selected from the group consisting of the pentaerythritol ester of partially hydrogenated wood rosin, the pentaerythritol ester of wood rosin, the glycerol ester of partially dimerized rosin, the glycerol ester of partially hydrogenated wood rosin, the glycerol ester of polymerized rosin, the glycerol ester of tall oil rosin, the glycerol ester of wood rosin, partially hydrogenated methyl ester of rosin, and mixtures of any two or more thereof.

5. The flavored chewing gum as defined in claim 1 wherein said artificial sweetener comprises free saccharin acid.

6. The flavored chewing gum as defined in claim 1 wherein said artificial sweetener comprises sodium saccharin, calcium saccharin or ammonium saccharin.

7. The flavored chewing gum as defined in claim 1 wherein said artificial sweetener is present in an amount within the range of from about 0.002 to about 4.5% by weight of the chewing gum.

8. The flavored chewing gum as defined in claim 1 wherein the artificial sweetener is present in an amount within the range of from about 0.5 to about 50% by weight of the ester gum component.

9. The flavored chewing gum as defined in claim 1 wherein the artificial sweetener is present in an amount within the range of from about 0.02 to about 15% by weight of the gum base.

10. The flavored chewing gum as defined in claim 1 wherein the artificial sweetener has good water-solubility and the ester gum is of relatively low viscosity.

11. The flavored chewing gum as defined in claim 1 wherein the artificial sweetener has poor water-solubility and the ester gum is of relatively high viscosity.

12. The flavored chewing gum in accordance with claim 1 wherein said gum base includes, in addition, a food acid incorporated in the ester gum component.

13. The chewing gum as defined in claim 12 wherein said food acid is selected from the group consisting of fumaric acid, adipic acid, succinic acid, citric acid, malic acid, ascorbic acid, tartaric acid or mixtures of any two or more thereof.

14. The chewing gum as defined in claim 13 wherein said food acid is fumaric acid, adipic acid or succinic acid.

15. A flavored chewing gum having a prolonged sour taste comprising a gum base, and an ester gum, and from about 0.02 to about 15% by weight of a food acid, based on the weight of the gum base, interdispersed in the gum base, said chewing gum being prepared by the process which comprises the steps of incorporating the food acid in the ester gum prior to dispersing the ester gum in said gum base, combining the resulting combination with gum base ingredients to form a gum base, and mixing the gum base with one or more flavors and sweeteners to form a chewing gum.

16. The chewing gum as defined in claim 15 wherein said food acid comprises fumaric acid, adipic acid, succinic acid, citric acid, tartaric acid, malic acid, ascorbic acid and mixtures thereof.

17. The chewing gum as defined in claim 15 wherein said food acid is present in an amount within the range of from about 0.002 to about 4.5% based on the weight of the chewing gum, from about 0.02 to about 15% based on the weight of the gum base, and from about 0.5 to about 50% based on the weight of the ester gum.

18. A gum base for use in forming a long-lasting flavored chewing gum including one or more ester gums and from about 0.02 to about 15% by weight based on gum base of an artificial sweetener or from about 0.02 to about 15% by weight based on gum base of food acid, said gum base being prepared by the process which comprises the steps of incorporating the artificial sweetener or food acid in the ester gum prior to incorporating the ester gum in other gum base components, and combining the resulting combination with other gum base ingredients to form a gum base wherein the artificial sweetener- or food acid-ester gum combination is interdispersed throughout the gum base matrix.

19. A method for forming a long-lasting flavored chewing gum, which comprises incorporating in one or more ester gums from about 0.02 to about 15% by weight based on gum base of an artificial sweetener or from about 0.02 to about 15% by weight based on gum base of food acid, combining the resulting combination with gum base ingredients to form a gum base and mixing the gum base with one or more flavors, sweeteners, emulsifiers and plasticizers to form a chewing gum.

* * * * *

UNITED STATES PATENT AND TRADEMARK OFFICE
CERTIFICATE OF CORRECTION

PATENT NO. : 4,087,557
DATED : May 2, 1978
INVENTOR(S) : Abraham I. Bakal et al.

It is certified that error appears in the above-identified patent and that said Letters Patent are hereby corrected as shown below:

Column 3, line 32, "the" should read --The--.
Column 8, line 30, after "170°F" please insert --and 240°F--.
Column 9, line 53, "812" should read --182--.

Signed and Sealed this

Tenth Day of October 1978

[SEAL]

Attest:

RUTH C. MASON
Attesting Officer

DONALD W. BANNER
Commissioner of Patents and Trademarks